United States Patent
Blackwelder et al.

(10) Patent No.: US 10,680,543 B2
(45) Date of Patent: Jun. 9, 2020

(54) SYNCHRONOUS ELECTRICAL POWER DISTRIBUTION SYSTEM STARTUP AND CONTROL

(71) Applicant: Rolls-Royce North American Technologies Inc., Indianapolis, IN (US)

(72) Inventors: Mark Jon Blackwelder, Plainfield, IN (US); Paul M. Rancuret, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/174,277

(22) Filed: Oct. 29, 2018

(65) Prior Publication Data
US 2019/0074786 A1 Mar. 7, 2019

Related U.S. Application Data

(63) Continuation of application No. 15/378,012, filed on Dec. 13, 2016, now Pat. No. 10,141,874.
(Continued)

(51) Int. Cl.
*H02P 9/00* (2006.01)
*H02P 9/08* (2006.01)
(Continued)

(52) U.S. Cl.
CPC .............. *H02P 9/08* (2013.01); *H02P 6/20* (2013.01); *H02P 9/10* (2013.01); *H02P 25/03* (2016.02); *H02P 1/46* (2013.01)

(58) Field of Classification Search
CPC ...... H02P 9/10; H02P 9/08; H02P 6/20; H02P 25/03; H02P 1/46; H02P 3/24;
(Continued)

(56) References Cited

U.S. PATENT DOCUMENTS

| 4,292,531 | A | 9/1981 | Williamson |
| 4,328,427 | A | 5/1982 | Bond |

(Continued)

FOREIGN PATENT DOCUMENTS

| CN | 102148492 B | 8/2014 |
| GB | 871 188 A | 6/1961 |
| JP | 2004-015980 A | 1/2004 |

OTHER PUBLICATIONS

Miri, A. M., C. Sihler, and T. Zöller. "Active Damping of Torsional Modes in Turbine-Generator Shafts." 2009, pp. 1-6, *IEEE Power Electronics Specialists Conference (PESC)*. 2009.
(Continued)

*Primary Examiner* — Julio C. Gonzalez
(74) *Attorney, Agent, or Firm* — Brinks Gilson & Lione

(57) ABSTRACT

A system may include a prime mover configured to provide mechanical energy to the system by spinning a shaft. The system further includes a synchronous AC generator mechanically coupled to the shaft, and an exciter mechanically coupled to the shaft and configured to output a field current for exciting the synchronous AC generator. The system also includes a number of synchronous electric motors electrically coupled to the AC generator and configured to drive one or more mechanical loads. A controller of the system is configured to establish and maintain a magnetic coupling between the synchronous AC generator and the synchronous electric motors by controlling a level of the field current during a ramped increase in rotation of the synchronous AC generator from zero rotational speed. The motors accelerate synchronously with the generator due to the magnetic coupling as the rotational speed of the generator increases.

15 Claims, 5 Drawing Sheets

Related U.S. Application Data

(60) Provisional application No. 62/267,143, filed on Dec. 14, 2015, provisional application No. 62/369,184, filed on Jul. 31, 2016, provisional application No. 62/369,191, filed on Jul. 31, 2016, provisional application No. 62/369,195, filed on Aug. 1, 2016.

(51) Int. Cl.
| | | |
|---|---|---|
| *H02P 9/10* | (2006.01) | |
| *H02P 6/20* | (2016.01) | |
| *H02P 25/03* | (2016.01) | |
| *H02P 1/46* | (2006.01) | |

(58) Field of Classification Search
CPC ........ H02P 2205/01; H02P 5/74; H02P 9/105; H02P 9/14; H02P 9/00
USPC ................... 322/44, 56, 20; 290/40 B, 40 R
See application file for complete search history.

(56) References Cited

U.S. PATENT DOCUMENTS

| | | | |
|---|---|---|---|
| 4,625,160 A | 11/1986 | Hucker | |
| 4,853,553 A | 8/1989 | Hosie | |
| 5,013,929 A | 5/1991 | Dhyanchand | |
| 5,387,859 A | 2/1995 | Murugan et al. | |
| 5,444,349 A | 8/1995 | Rozman et al. | |
| 5,546,742 A | 8/1996 | Shekhawat et al. | |
| 5,581,168 A | 12/1996 | Rozman et al. | |
| 5,587,647 A | 12/1996 | Bansal et al. | |
| 6,198,176 B1 | 3/2001 | Gillette | |
| 6,879,053 B1* | 4/2005 | Welches | H02J 3/30 290/1 A |
| 7,116,073 B1 | 10/2006 | Sorkin | |
| 7,173,399 B2 | 2/2007 | Sihler et al. | |
| 8,358,111 B2 | 1/2013 | Rozman et al. | |
| 8,890,454 B2 | 11/2014 | De Franciscis | |
| 9,586,690 B2 | 3/2017 | Rajashekara et al. | |
| 10,141,874 B2* | 11/2018 | Blackwelder | H02P 9/08 |
| 2003/0098671 A1* | 5/2003 | Hochgraf | H02J 3/38 322/36 |
| 2009/0167231 A1 | 7/2009 | Sussmeier et al. | |
| 2011/0080040 A1 | 4/2011 | Kumar | |
| 2011/0109085 A1 | 5/2011 | Nelson | |
| 2012/0098261 A1* | 4/2012 | Rozman | F02N 11/006 290/31 |
| 2012/0223531 A1 | 9/2012 | Brooks et al. | |
| 2012/0306458 A1 | 12/2012 | Fogarty et al. | |
| 2012/0313372 A1* | 12/2012 | Bjerknes | F01D 15/10 290/34 |
| 2013/0175871 A1 | 7/2013 | Knüppel et al. | |
| 2014/0333127 A1 | 11/2014 | Edwards | |

OTHER PUBLICATIONS

International Search Report, PCT Application No. PCT/US2016/066422, pp. 1-23, May 3, 2017, European Patent Office, Rijswijk, The Netherlands.

* cited by examiner

SYNCHRONOUS ELECTRICAL POWER DISTRIBUTION SYSTEM STARTUP AND CONTROL

CROSS-REFERENCE TO RELATED APPLICATIONS

This application is a continuation of U.S. patent application Ser. No. 15/378,012 filed Dec. 13, 2016, which claims priority under 35 USC § 119(e) to U.S. provisional application 62/267,143, "SYNCHRONOUS ELECTRICAL POWER DISTRIBUTION SYSTEM STARTUP AND CONTROL" filed Dec. 14, 2015, and which also claims priority under 35 USC § 119(e) to U.S. provisional application 62/369,184, "SYNCHRONOUS ELECTRICAL POWER DISTRIBUTION SYSTEM" filed Jul. 31, 2016, and which also claims priority under 35 USC § 119(e) to U.S. provisional application 62/369,191, "SYNCHRONOUS ELECTRIC POWER DISTRIBUTION SYSTEM STARTUP" filed Jul. 31, 2016, and which also claims priority under 35 USC § 119(e) to U.S. provisional application 62/369,195, "SYNCHRONOUS ELECTRIC POWER DISTRIBUTION EXCITATION CONTROL SYSTEM" filed Aug. 1, 2016, all of which are incorporated herein by reference.

TECHNICAL FIELD

This disclosure relates to synchronous alternating current systems and, in particular, to synchronous generators.

BACKGROUND

Synchronous power systems are commonly used for efficiently powering electrical motors that drive fans, compressors, pumps, and other types of loads. Asynchronous electrical machines produce (e.g., motors) or consume (e.g., generators) torque only in conditions where the mechanical speed is different than the electrical speed. The magnitude of the difference of mechanical and electrical speeds is commonly referred to as "slip". Asynchronous motors produce at least partial, and up to full rated, torque at all mechanical speeds less than the electrical voltage speeds, thus allowing acceleration rapidly to near matching electrical and mechanical speeds when connected to an electrical bus operating at constant speed, or "line start". The ratio of electrical speed with respect to mechanical speed of an electrical machine is defined by the number of magnetic pole pairs of the specific design. Examples of asynchronous motors are induction motors which function based on Eddy current phenomena and hysteresis motors which rely on magnetic hysteresis phenomena. Induction motors are commonly used to drive mechanical loads from fixed speed national electric grids due to their "line start" capacity.

Synchronous electrical machines produce (e.g., motors) or consume (e.g., generators) torque only in conditions where the mechanical speed is equal to the electrical speed and the rotor and stator magnetic poles are misaligned. Synchronous machines commonly cannot "line start" due to the impractical requirement to connect the nonrotating motor to the rotating electrical grid at precisely aligned stator and rotor magnetic poles and develop sufficient torque to accelerate the rotor to electrical speed before misalignment exceeds ninety degrees electrical, where accelerating torque decreases and becomes negative at one hundred eighty degrees electrical.

SUMMARY

In one example, the disclosure is directed to a system that includes a prime mover configured to provide mechanical energy to the system by spinning a shaft, and a synchronous AC generator comprising a rotor mechanically coupled to the shaft. The system may also include an exciter mechanically coupled to the shaft and configured to output a variable field current to excite the synchronous AC generator. In addition, the system may include synchronous electric motors electrically direct coupled to the synchronous AC generator and each comprising a rotor rotatable operable to drive one or more mechanical loads. Further, the system may include a controller configured to establish and maintain a magnetic coupling between the rotor of the synchronous AC generator and all of the rotors of the synchronous electric motors by controlling a level of the field current during a ramped increase in rotation of the rotor of the synchronous AC generator from zero rotational speed.

In another example, the disclosure is directed to a method that includes initiating rotation of a prime mover to commence a ramped increase in rotational speed of a synchronous AC generator from a zero speed condition, and establishing, by a controller, a level of a field current to excite the synchronous AC generator to form a magnetic coupling between the synchronous AC generator and a plurality of synchronous electric motors that are electrically coupled to the synchronous AC generator and configured to drive respective mechanical loads. The method may also include controlling, by the controller, the level of field current to maintain the magnetic coupling during the ramped increase in rotational speed of the synchronous AC generator to a full rated speed condition so that the plurality of synchronous electric motors stay synchronized with the synchronous AC generator.

In yet another example, the disclosure is directed to a system that includes a synchronous AC generator rotated by a prime mover to generator electric power, an exciter rotated by the prime mover to generate a field current to excite the synchronous AC generator, and a controller. The controller configured to control a level of excitation of the exciter to form a magnetic coupling between the synchronous AC generator and a plurality of synchronous electric motors electrically coupled with the synchronous AC generator. The field current generated and the magnetic coupling formed as the synchronous AC generator and the exciter are accelerated from a zero speed condition by the prime mover. The controller further configured to control the level of excitation of the exciter to maintain the magnetic coupling and synchronously accelerate the plurality of synchronous electric motors with the synchronous AC generator toward a rated speed of the synchronous AC generator.

The details of one or more examples are set forth in the accompanying drawings and the description below. Other features, objects, and advantages of the disclosure will be apparent from the description and drawings, and from the claims.

DETAILED DESCRIPTION

The techniques and circuits described in this disclosure may enable a controller of an example synchronous power system to magnetically couple a generator to one or more load driving synchronous motors by controlling the field current of an exciter during a ramped increase in rotation of the generator from zero rotational speed. The magnetic coupling allows the generator to initiate and sustain synchronous rotation with the synchronous motors so that the generator and the motors may accelerate synchronously throughout the ramped increase in rotational speed. As such, the example synchronous power system may establish and maintain generator to load-motor magnetic coupling during a ramped increase in rotational speed without being subject to an increase in mass or decrease in efficiency that is commonly caused by power electronics, pony motors, and induction rotor devices which are typically used to synchronize motors or loads to a generator in other power systems, where the generator is already rotating at rated speed.

Figure 1:
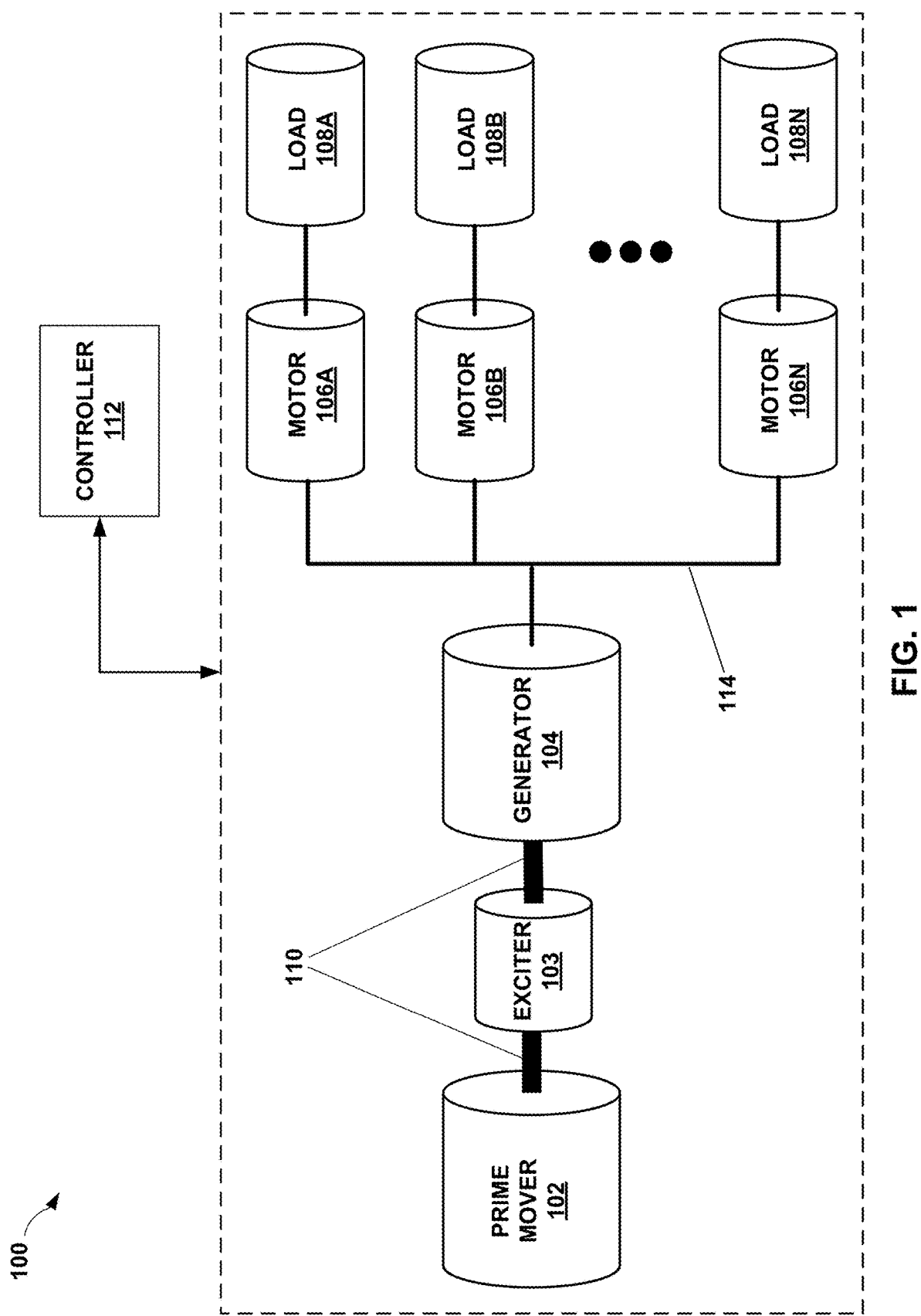
FIG. 1 is a conceptual diagram illustrating an example synchronous power system for providing electrical power from an alternating current synchronous generator to synchronous motors, in accordance with one or more aspects of the present disclosure.

FIG. 1 is a conceptual diagram illustrating system 100 as an example synchronous power system for providing polyphase electrical power from at least one synchronous alternating current generator to synchronous motors, in accordance with one or more aspects of the present disclosure. The polyphase electrical power may be balanced polyphase electrical power, such as three phase or six phase balanced electrical power. System 100 includes prime mover 102, exciter 103, generator 104, motors 106A-106N (collectively referred to as "motors 106), and loads 108A-108N (collectively referred to as "loads 108"). System 100 also includes controller 112 for controlling each of components 102, 103, 104, 106, and 108.

Prime mover 102 is configured to provide mechanical energy to system 100 by rotating or spinning shaft 110. Prime mover 102 is any type of machine, whether an engine or a motor, that is configured to produce mechanical energy for use in a synchronous power system. Examples of prime mover 102 include heat engines (e.g., internal or external combustion engines), electrical motors, pneumatic motors, hydraulic motors, jet engines, or any other type of machine that can be controlled so as to provide a controlled, ramped acceleration of the rotational speed of shaft 110 during startup. As used herein, the term ramped acceleration or ramped increase in rotation or ramp refers to a controlled increasing rate of change of speed of a prime mover and generator from zero rotational speed to rated or operational rated speed, that occurs over a predetermined period of time commensurate with the torque capacity used to accelerate the combined rotational inertias of motors and loads and any losses associated with all devices receiving power from the generator. In example systems, the period of time for the ramped increase from zero rotational speed to rated or operational rated speed of the generators and magnetically coupled motors (loads) is greater than thirty seconds. In some examples, the ramped acceleration or speed of prime mover 102 can be finely controlled during start-up. For example, prime mover 102 may be controllable so that the speed of prime mover 102 increases during a first phase of a start-up period (e.g., from one to two seconds, up to about thirty seconds), from substantially zero to a relatively small predetermined percentage, such as one percent of its operational speed. During the first phase, or establishment phase, of the ramp the magnetic coupling between the generator and the motors may be established. Once prime mover 102 reaches the relatively small predetermined percentage, such as one percent, of its operational speed, and the magnetic coupling is established, prime mover 102 may be controlled so that the ramp speed of prime mover 102 increases during a second phase of the start-up period (e.g., thirty to fifty seconds), from one percent to eighty or one hundred percent of the prime mover's operational speed, such as rated speed. During the second phase, or maintain phase, the magnetic coupling between the generator 104 and the motors 106 may be maintained such that as the generator 104 accelerates, the motors synchronously accelerate to maintain the same rotational speed as the generator. Accordingly, the ramped speed of the generator 104 and motors 106 may continue to increase until rated speed or operational speed is reached. In other examples, the ramped acceleration of the shaft 110 during startup may follow one or more predetermined acceleration profiles. The acceleration profile(s) may be illustrated as one or more curves that increase over a predetermined period of time to reach a target operational speed, such as rated speed. The acceleration profile(s) and/or acceleration ramps may be based on available levels of the field current $I_{FIELD}$, load configuration, saturation levels of the generator 104 and the loads, and/or impedances of the generator, loads and system. Thus, the magnitude and rate of ramped acceleration may be controlled such that magnetic coupling between the generator 104 and the motors 106 is established and maintained along the entirety of the predetermined acceleration curve(s) and/or ramped acceleration.

Exciter 103 and generator 104, in combination, convert the mechanical energy provided by prime mover 102 into a suitable form of electrical energy for powering and spinning motors 106 to drive loads 108. Alternatively, exciter 103 and generator 104 may be on separate shafts, or exciter 103 may not be a shaft driven device. The controller 112 and the exciter 103 may cooperatively operate as an excitation system 105 to provide or otherwise output a variable excitation signal. The excitation signal may be, for example, a field current $I_{FIELD}$ (also referred to as a "magnetizing current") to generator 104. In this example, generator 104 uses the field current $I_{FIELD}$ to magnetize the electromagnets in its rotor such that when the rotor spins with shaft 110, generator 104 produces an alternating current at electrical bus 114. Exciter 103 may produce the field current $I_{FIELD}$ by producing an electromotive force (EMF) which induces an alternating (AC) current, and then by rectifying the AC current, exciter 103 outputs the field current $I_{FIELD}$ in a direct (DC) current form.

In the example of FIG. 1, generator 104 is a synchronous AC generator. In some examples, generator 104 is configured to output variable frequency, three-phase AC power onto bus 114. In other examples, generator 104 may output any poly-phase (e.g., two or more phase) AC power onto a single bus such as bus 114 or multiple buses. In the example of FIG. 1, exciter 103 may be a brushless field exciter (e.g., a rotating-rectifier exciter). Exciter 103 may be any type of exciter that can produce a controllable excitation signal, such as field current $I_{FIELD}$. The terms excitation signal and field current $I_{FIELD}$, are used interchangeably herein, however, the excitation signal may be any other form of variable signal capable of causing a generator to output a variable voltage and current to supply variable power to a load. Thus, it is to be understood that the description of the output of the exciter or excitation system as a field current does not limit the operation of the generator or the output of the exciter or the excitation system to only a field current.

Motors 106 represent any type of synchronous motor for receiving AC electrical power provided by a synchronous power system, such as polyphase electrical power provided by system 100. In the example of FIG. 1, motors 106 are electrically coupled to generator 104 via bus 114. For example, motors 106 may be propulsion motors for an aircraft or marine craft, for example, for driving propellers. Motors 106 may include additional sensors and/or feedback circuitry for providing information (e.g., voltage, current, speed, frequency, phased, etc.) back to the components of system 100 that are used to control motors 106, such as controller 112.

Loads 108 represent any type of motor-driven load. In the example of FIG. 1, loads 108 are mechanically coupled to motors 106. Examples of loads 108 include propellers, fans, compressors, pumps, screws, or any other type of load that is driven by an electrical motor, such as one of motors 106, and do not exhibit zero speed or static torque. Thus, the loads 108 may exhibit a linear increase in counter torque as the rotational speed of individual loads 108 increases with a corresponding increase in the speed of a motor 106. The loads may be non-linear loads having torque that is monotonic to speed so that as speed increases, torque increases. In other words, torque may be continuous through a range of speed such that the motors may have a uniformly smooth torque curve.

System 100 includes controller 112, which is configured to establish and maintain a magnetic coupling between generator 104 and the motors 106 during a ramped increase in rotational speed of the synchronous AC generator 104 from a zero speed condition. The magnetic coupling may be established and maintained controller 112 by operation in the excitation system 105 to control a level of the excitation signal, or field current $I_{FIELD}$, being output from exciter 103. For the sake of brevity and clarity, controller 112 is shown as, generally, being operatively coupled to any or all of components 102, 103, 104, 106, and 108, 110, and 114. In other words, controller 112 is configured to provide signals and information to, and receive information from (e.g., as feedback), each of the different components of system 100. For example, controller 112 may send information to prime mover 102 to vary the acceleration or speed of shaft 110. As another example, during operation as part of the excitation system 105, the controller 112 may send information to exciter 103 so the excitation system 105 may vary or otherwise control the variable excitation signal in the form of the field current $I_{FIELD}$ provided to generator 104.

Controller 112 may comprise any suitable arrangement of hardware that may include software or firmware configured to perform the techniques attributed to controller 112 that are described herein. Examples of controller 112 include any one or more computing systems, computing devices, microprocessors, digital signal processors (DSPs), application specific integrated circuits (ASICs), field programmable gate arrays (FPGAs), or any other equivalent integrated or discrete logic circuitry, as well as any combinations of such components. Thus, there may be any number of independently operating controllers 112 in the system 100 that may or may not be in direct communication with each other. Controller 112 that includes software or firmware also includes hardware, such as one or more processors, processing units, processing components, or processing devices, for storing and executing the software or firmware contained therein.

In general, a processor, processing unit, processing component, or processing device is a hardware device that may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may be any form of storage medium that is other than transitory, and may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed) and may include or comprise any suitable storage medium, such as a non-transitory storage medium, for storing instructions that can be retrieved and executed by a processor of controller 112.

In some examples, controller 112, or any portion thereof, may be an internal component or feature of any of components 102, 103, 104, 106, or 108. In other words, any one or more of components 102, 103, 104, 106, or 108 may include controller 112, or any feature or characteristic associated with controller 112 that is described herein, as an internal component.

In operation, controller 112 may provide a signal or command (directly or indirectly) to prime mover 102 that causes shaft 110 to begin spinning with a particular rotational acceleration in accordance with the signal or command provided by controller 112. For example, the controller 112 may accelerate the shaft 110 through the first phase or the establishment phase. A t a time when the rotational acceleration of the shaft 110 and the generator 104 is relatively low, such as during the first phase, the controller 112 may provide an additional signal or command to exciter 103 that causes exciter 103 to produce a particular field current $I_{FIELD}$, or excitation signal. The excitation signal and speed with which shaft 110 spins may cause generator 104 to output a two or more phase AC electric power across electrical bus 114. The voltage of the electric power may be only a fraction of the operational voltage of the generator 104 due to the relatively low rotational speed of the generator 104. The current of the electric power may be of sufficient magnitude, however, to provide a torque producing current sufficient to establish the magnetic coupling and induce rotation of motors 106. Motors 106 may be energized by the AC electric power received via bus 114 to rotate synchronously with the ramped increase in rotational speed of the generator to drive loads 108.

By providing signals and/or commands to prime mover 102, exciter 103, and generator 104, controller 112 may establish the magnetic coupling between generator 104 and motors 106 by controlling the field current $I_{FIELD}$ exciter 103 provides to generator 104 and by also controlling the acceleration or speed of shaft 110. As such, controller 112 may establish and maintain generator to load-motor magnetic coupling during the startup phase of the generator such that the generator and the motors accelerate at about the same speed during the ramped increase in speed of the generator. Accordingly, system 100 may not suffer from an increase in mass or decrease in efficiency that is commonly caused by power electronics, pony motors, and induction rotor devices which are typically used to synchronize motors to a generator of other power systems, after the generator is already rotating at rated speed.

Figure 2:
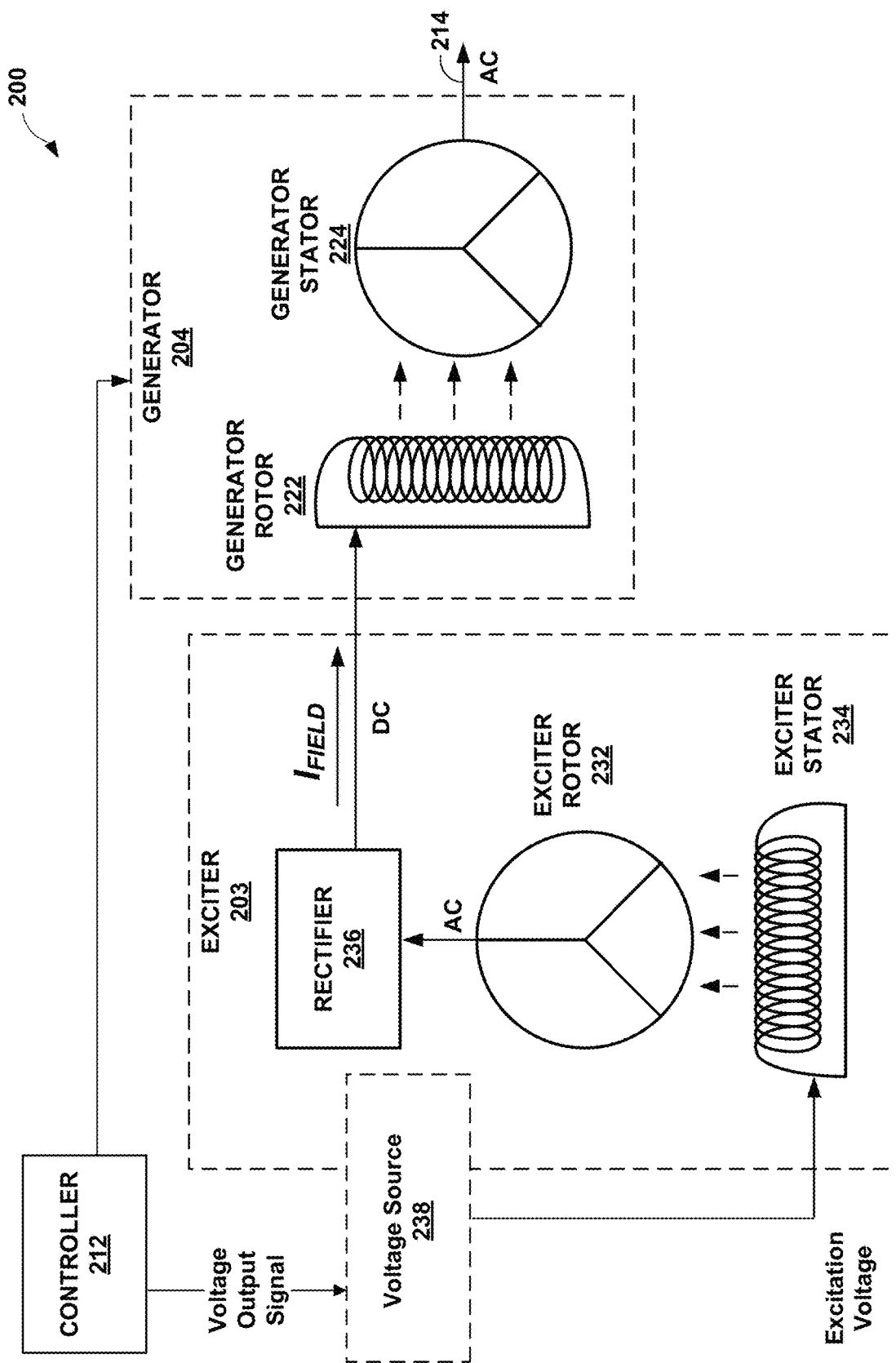
FIG. 2 is a schematic diagram illustrating a portion of an example synchronous power system for providing electrical power from a synchronus alternating current generator to synchronous motors, in accordance with one or more aspects of the present disclosure.

FIG. 2 is a schematic diagram illustrating system 200 as a portion of an example generator of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 200 is described within the context of FIG. 1. For example, exciter 203 and generator 204 of system 200 represent examples of, respectively, exciter 103 and generator 104 of system 100. Exciter 203 and generator 204 are controllable by controller 212 of system 200 which represents an example of controller 112 of system 100, and excitation system 205 represents an example similar to excitation system 105.

Exciter 203 represents an example of a brushless exciter and is configured to output an excitation signal, such as field current $I_{FIELD}$ to generator 204. Exciter 203 is controllable by controller 212 such that signals or commands from controller 212 in the form of a voltage output signal (exciter voltage) cause exciter 203 to output a variable level excitation signal, such as a variable field current $I_{FIELD}$. In other words, the excitation system 205 outputs a variable excitation signal, and the generator 204 generates output power for the motors based on the variable excitation signal. Exciter 203 includes exciter rotor 232, exciter stator 234, and rectifier 236. Exciter 203 may include other components required to produce the variable excitation signal.

In the example of FIG. 2, generator 204 may include field coils in which the excitation signal in the form of field current $I_{FIELD}$ flows. Rectifier 236 rectifies an AC current output from exciter rotor 232 to a DC field current $I_{FIELD}$ output that is used by generator 204 to magnetize generator rotor 222. In some examples, rectifier 236 is a full-bridge rectifier.

Exciter stator 234 may include an exciter field coil, which is a set of stationary coils. In other words, the exciter field coil does not move or spin with movement of a prime mover shaft. Exciter stator 234 may be energized, by controller 112 using a controlled variable voltage source 238, to induce a current in the exciter stator 234. The voltage source 238 may supply the exciter voltage. The voltage source 238 may transition the exciter voltage between AC voltage and DC voltage such that an AC current, a DC current or some combination of an AC current waveform and a DC current waveform may be induced with the exciter stator 234. Accordingly, the exciter voltage may selectively include an AC component and a DC component. The level of the AC component and the DC component in the exciter voltage may be selectively and/or independently varied by the controller based on a rotational speed of the exciter rotor 232. Thus, a waveform of the exciter voltage may selectively include at least one of an AC component or a DC component. In addition, the controller may transition a level of the AC component lower and transition of a level of the DC component higher based on an increase in rotational speed of the exciter while electric power output of the synchronous generator is occurring.

Controller 112 may control the voltage level of the voltage source 238 (exciter voltage) via the voltage output signal to vary the level of the DC current that is induced by exciter stator 234. The voltage source 238 is illustrated with dotted lines since the voltage source 238 may be included in the controller 212, and may be controlled using a voltage regulation circuit or through other voltage regulation techniques. Alternatively, the voltage source 238 may be a separate device or system that receives the voltage output signal from the controller 212 and produces the exciter voltage, or may be included in the exciter 203 and receives the voltage output signal. For purposes of brevity, the exciter voltage will be described as being controlled by the controller 212 using a voltage output signal, although it should be recognized that the controller 212 may provide the exciter voltage or control output of the exciter voltage.

Exciter rotor 232 may include an exciter armature, which is a set of balanced coils, coupled to shaft 110 (not shown) of system 100, which is driven by prime mover 102 of system 100, and controlled by controller 212 to spin at a variable speed or acceleration. In other words, unlike the exciter field coil which remains stationary, the exciter armature may move or spin with movement of a prime mover shaft. The balanced coils of exciter rotor 232 are connected through rectifier 236 to generator rotor 222. When the exciter armature of exciter rotor 232 is rotating or spinning, the magnetic flux produced by the exciter field coil of exciter stator 234 is provided by the exciter armature coils of exciter rotor 232 to rectifier 236. This change in magnetic flux in the exciter armature coils of exciter rotor 232 generates an electromotive force (EMF). This EMF induces current in the field winding of generator rotor 222 during a first portion of the EMF AC cycle. The flux produced by the exciter armature coil of exciter rotor 232 then decreases as it leaves the magnetic flux region of exciter field coil of exciter stator 234, and an opposite EMF is generated. Rectifier 236 naturally applies the EMF in a consistent manner to induce current flow in one direction, as field current $I_{FIELD}$, through the field coil of generator rotor 222.

Generator 204 is configured to output an AC power to electrical bus 214. Generator 204 is controllable by controller 212 such that a signal and/or command (voltage output signal) from controller 212 controls the exciter voltage, which may cause generator 204 to output AC power at a variable power level or variable frequency at bus 214. Generator 204 includes generator rotor 222 and generator stator 224.

Generator rotor 222 may include a rotating field coil that spins or rotates with shaft 110 of system 100 congruently with the spinning or rotation of exciter rotor 232. The field coil of generator rotor 222 is typically much more inductive than the rotor coils of exciter rotor 232, and as such, the field coil of generator rotor 222 may filter the fundamental frequency of field current $I_{FIELD}$ (i.e., the rectified exciter current). Field current $I_{FIELD}$ from exciter 203 magnetizes generator rotor 222.

Generator stator 224 includes a set of stationary coils which do not move or spin with movement of shaft 110. As generator rotor 222 rotates with the spinning of shaft 110, the resultant magnetic field produced by field current $I_{FIELD}$ running through the rotating field coil of generator rotor 222 induces an AC current out of generator stator 224 at bus 214. The controller 212 controls the level of the field current by application of the excitation voltage to the exciter with a magnitude and/or frequency to induce a terminal voltage at the generator terminals. During the ramped increase in rotation of the generator rotor 222, the frequency of the voltage varies from just a hertz or two during the establishing phase, up to full load rated speed during the maintaining phase.

During the establishing phase, when the controller 112 is establishing the magnetic coupling between the synchronous generator 204 and the synchronous motors 106, the generator rotor 222 may be spinning at a frequency that is just high enough to produce some fraction of the rated voltage output of the generator 204. In addition, based on the field current $I_{FIELD}$, generator 204 may also output torque producing current on the bus 214. The torque producing current may be controlled with the field current $I_{FIELD}$ so as to produce enough current at the motors 106 to initiate rotation by establishing the magnetic coupling.

The generator 204 and exciter 203 may be designed to provide a predetermined range of the field current $I_{FIELD}$. The predetermined range of the field current may be greater than 0-100 percent of the expected operational range of the field current during rated speed operation of the generator 204. Thus, during the ramped acceleration, the field current may be increased above 100 percent to establish the magnetic coupling, and then may be reduced, as the generator 204 and the motors synchronously accelerate at a common rotational speed. In an example, the field current $I_{FIELD}$ may be increased to 150%, or some other percentage, during the establishing phase of ramped acceleration to initially commence the magnetic coupling (e.g. overcome non-rotational force to get the motors to start rotating), and then reduced during the maintaining phase as the rotation speed accelerates. In other examples, other percentages of the field current $I_{FIELD}$ may be used in accordance with system design parameters such as system impedance, cooling capabilities of the generator 204 and the motors, and also operating parameters such as rotational speed, counter torque forces in the motors, and other factors affecting the ability to initiate rotation and maintain rotation of the motors during the ramped acceleration without exceeding system capabilities.

In an example configuration, the synchronous motors may drive loads that are close to zero counter torque at low speed, and the synchronous motors will have no back electromagnetic force (EMF) at zero rotational speed. Thus, in this example, the magnitude or level of the torque producing current during the establishing phase need only overcome the static friction or stiction of the motors 106 and corresponding loads to initiate rotation of the motors synchronously with the generator. In other examples, some additional counter torque related forces may be present such that the magnitude of the torque producing current may need to be high enough to overcome such forces. In an example of a 4 KV generator, the generator may rotate during the ramped acceleration of the establishing phase at a low speed and sufficiently excited, such as at 125%, to produce millivolts of voltage a frequency of 1 or 2 Hz (such as at 0.5 revolutions-per-minute), while also producing enough torque producing current, such as 5 amps of starting current, from the bus 214 to energize and initiate rotation of each of the motors.

As the rotational speed of the generator 204 accelerates, the generator 204 enters the second phase, or maintaining phase, of ramped acceleration where the field current $I_{FIELD}$ is controlled by the controller 112 to maintain the magnetic coupling. The level of the field current $I_{FIELD}$ may be controlled by the controller 112 based on a relational difference in an angle of deflection between a position of the generator rotor 222 and a position of the rotors of the motors 106. As the speed changes, or as the load fluctuates during ramped acceleration, there may be changes in the angular deflection between the rotor angle of the generator rotor 222 and an average of the rotor angles of the synchronous motors. In response to such changes in angular deflection, the field current $I_{FIELD}$ may be adjusted correspondingly by the controller 112, according to the determined relation, to maintain the magnetic coupling. In an example, as the speed accelerates during the ramped acceleration, and the voltage on the bus 214 increases, the field current $I_{FIELD}$ may be correspondingly reduced below 100% as the magnetic coupling stiffens due to changing system parameters, such as increased voltage on the bus 214.

Differences in angular deflection between the angular position of the generator rotor 222 and an average of the angular position of the rotors of the synchronous motors may be directly measured using sensors, such as shaft position sensors. Alternatively, or in addition, the angular position of the respective generator and motors may be determined based on operational parameters. Examples of operational parameters from which the angular deflection may be inferred include power angle of the electric power generated by the generator 204; voltage and current of the bus 214 and speed of synchronous rotation of the generator 204 and the motors; voltage and current vectors of the power at the bus 214; or any other combination of system parameters from which a difference in angular rotor positions may be determined.

In an example system, the impedance of the generator 204 may be substantially matched with the system impedance so as to substantially balance the torque producing current being supplied to the motors during the ramped acceleration. System impedance may include the parallel impedance of all the motors, and other impedance in the system, such as cable impedance and the like. In this configuration, the generator 204 may be substantially matched to the characteristics of the motors so that the ramped acceleration profile provides a "soft start" capability. This soft start capability may be sufficient to initiate rotation of the motors and maintain the magnetic coupling without overcurrent conditions based on controlling the ramped acceleration and the generator excitation. Overcurrent conditions may also be accounted for in substantially matching the generator 204 and the motors by provided an increased saturation margin of the exciter and/or the generator rotor. In addition, generator or motor cooling and/or other forms of increased current carrying capability, such as larger connecting power cables may be employed to substantially match the generator and the motors.

Figure 3:
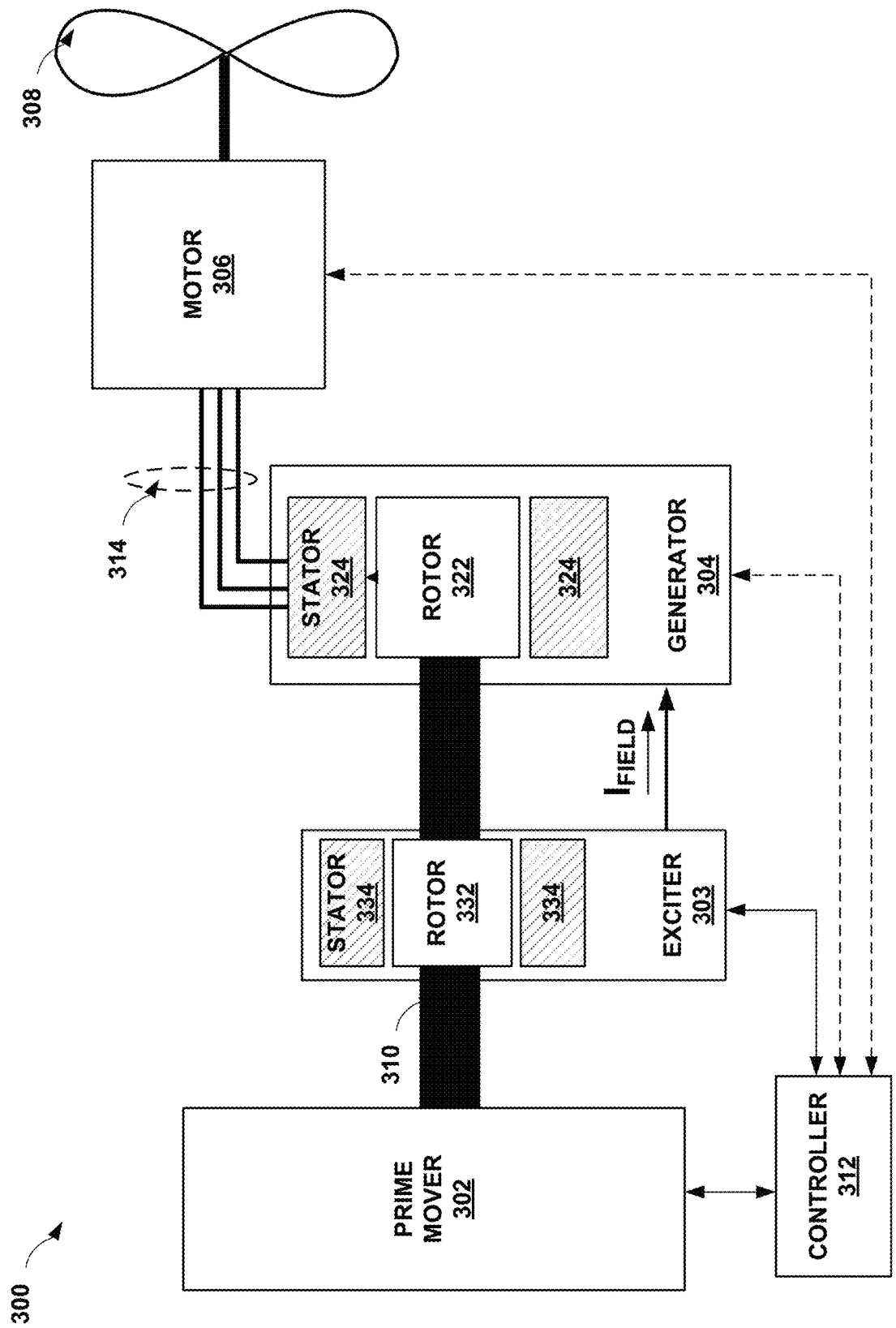
FIG. 3 is a conceptual diagram illustrating a portion of an example synchronous power system for providing electrical power from a synchronous alternating current generator to synchronous motors, in accordance with one or more aspects of the present disclosure.

FIG. 3 is a conceptual diagram illustrating system 300 as a portion of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 300 is described within the context of system 100 of FIG. 1 and system 200 of FIG. 2. For example, exciter 303 and generator 304 of system 300 represent examples similar to, respectively, exciter 103 and generator 104 of system 100 or exciter 203 and generator 204 of system 200. Exciter 303 and generator 304 are controllable by controller 312 of system 300 which represents an example similar to the controllers 112 and 212 of systems 100 and 200, and excitation system 305 represents an example similar to excitation systems 105 and 205.

System 300 includes prime mover 302 as an example of prime mover 102 of system 100. Prime mover 302 produces mechanical energy that spins shaft 310 which causes rotor 332 of exciter 303 and rotor 322 of generator 304 to also spin or rotate as exciter 303 and generator 304 may be both mechanically coupled to shaft 310. In other words, rotor 332 and rotor 322 may be mechanically coupled to prime mover 302 via shaft 310. In other examples, exciter 303 and generator 304 may be on separate shafts, or exciter 303 may not be a shaft driven device.

System 300 further includes motor(s) 306 and load(s) 308. Motor 306 is driven by a three-phase AC electrical signal output from generator 304 onto link 314. In the example of system 300, motor 306 is a synchronous propulsor motor which is mechanically coupled to load 308 by a rotatable shaft 336. A rotor 338 included in the motor 306 is rotatably coupled with the shaft 336, and is magnetically coupled with the rotor 322 of the generator 304 to drive the shaft 336. In the example of FIG. 3, load 308 is a fan or a propeller, or another load having a torque curve starting from substantially zero counter torque at zero speed. In the illustrated example, system 300 includes one motor 306, however, is it understood that system 300 may include more than one motor 306 and more than one load 308, including any and all other examples of motors 106 and loads 108 described above with respect to system 100.

Controller 312 of system 300 may send and receive information for controlling the speed at which shaft 310 spins, the current or voltage level at bus 314, and/or the speed at which motor 306 spins load 308. For example, controller 112 may provide a signal or command to prime mover 302 that causes prime mover 302 to initiate a ramped increase of spinning shaft 310 from zero speed with a acceleration profile defined by the signal from controller 312. Controller 312 may also operate within the excitation system 305 to provide a signal or command (voltage output signal) to exciter 303 that causes exciter 303 to output a variable excitation signal such as a particular field current $I_{FIELD}$ in accordance with the signal or command from controller 312 that provides the exciter voltage. The field current $I_{FIELD}$ produced by exciter 303 and the speed with which shaft 310 spins may cause generator 304 to output three-phase AC electric power across electrical bus 314. Motor 306 may use the voltage and current from the AC electric power received via bus 314 to magnetically couple the rotor 338 to the rotor 322 and drive load 308. Thus, the generator 304 may generate variable power to magnetically couple the motors 306 based on a variable excitation signal output by the excitation system 305. Magnetic coupling of the generator 304 and the rotors 304 may be established when electrical poles in the generator 304 are substantially aligned with magnetic poles in the motors 306.

Substantial alignment of the electrical poles in the generator 304 and the motors 306 may be based on an angular difference between a position of the generator rotor and a position of the motor rotors. For example, the generator and motors may be remain substantially aligned when angular differences between the generator rotor and the motor rotors remain within about ninety degrees. During operation, different parameters, such as variations in the load, and variation in the rotational speed can vary a torque deflection angle or angular difference between a vector representing a position of the generator rotor and a vector representing a position of the motor rotors. For example, changes in motor load torque for some or all of the loads, or a ramped increase in rotational speed of the generator and motors may vary the angular difference. In some example, the motor rotors vector may represent an average of the rotor positions of different motors. The controller 312 may correspondingly vary the field current to control the angular difference by varying the amount of torque producing current supplied to the motors during ramped acceleration and during operation at rated rotational speed. For example, the controller may vary the field current to minimize the deflection angle, or maintain the deflection angle, or keep the deflection angle at less than ninety degrees.

Figure 4:
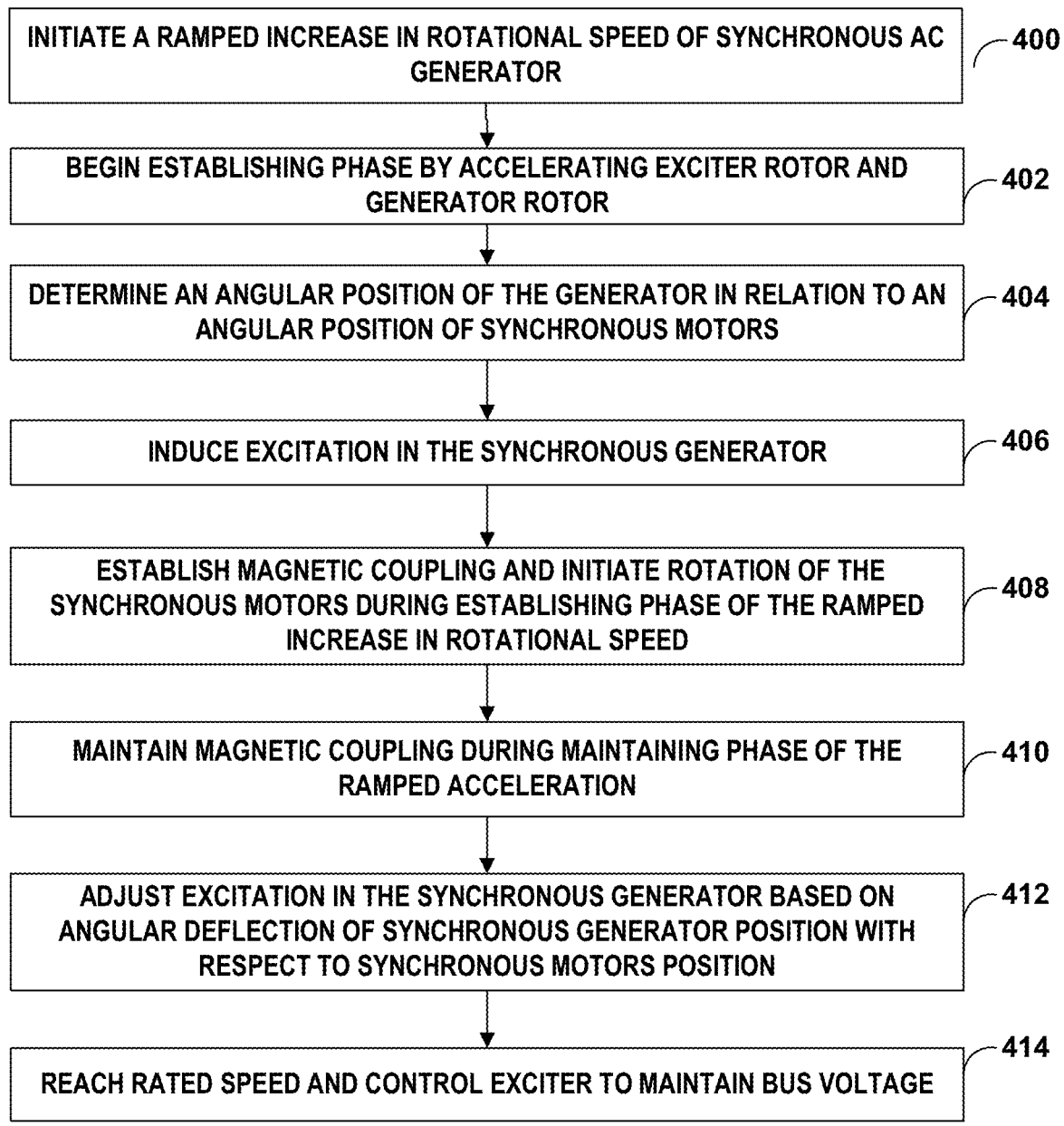
FIG. 4 is a flow chart illustrating example operations performed by a controller of an example synchronous power system for providing electrical power from a synchronous alternating current generator to synchronous motors, in accordance with one or more aspects of the present disclosure.

FIG. 4 is a flow chart illustrating example operations performed by a controller of an example synchronous power system, such as system 100 of FIG. 1, for providing polyphase electrical power from a synchronous alternating current generator to synchronous motors, in accordance with one or more aspects of the present disclosure. FIG. 4 is described below within the context of FIGS. 1-3. For the sake of brevity, operations 400-420 are described as being performed by controller 112 of FIG. 1 although controllers 212 and 312 may also perform operations 400-420.

Controller 112 may magnetically couple generator 104 to motors 106 during ramped acceleration of generator 104 by providing signals and commands, to prime mover 102, exciter 103, and generator 104. The signals and commands include controlling the excitation signal, such as the field current $I_{FIELD}$ exciter 103 provides to generator 104, and controlling the rotational acceleration of shaft 110. Controller 112 therefore may have control with respect to the start of prime mover 102 and its rate of ramped acceleration of shaft 110, and controller 112 may have control with respect to the excitation signal, such as the field current $I_{FIELD}$, provided to generator 104. Since system 100 powers loads 108 that have a torque requirement that increases in accordance with rotational speed, controller 112 may control system 100 to establish and maintain the magnetic coupling using voltage and torque producing current sufficient to initiate rotation of the motors with the generator, and synchronously maintain the acceleration of the generator and the motors during the ramped increase in rotation. The magnitude and duration of voltage and current generated by the generator and supplied to the loads may be based on system design, such as substantially matching the impedance of the generator and the loads, providing sufficient margin for supply of excitation voltage of 125% to 150% of full rated output of the generator 104, and otherwise tailoring the operation of the generator 104 to the characteristics of the motors and/or loads being magnetically coupled. As such, controller 112 may perform generator to load-motor magnetic coupling during ramped acceleration of the generator without the need for additional power electronics, pony motors, and induction rotor devices that are typically used to synchronize motors to a generator of other power systems, after the generator is already rotating at rated speed.

To implement the control concept provided by controller 112, motors 106 and generator 104 may be impedance matched and controller 102 may control the excitation signal, such as the field current $I_{FIELD}$ provided by exciter 103, to enable rotor magnetic flux at generator 104 to produce sufficient voltage and torque producing current at the motors even when ramped acceleration of shaft 110 is in the establishing phase, or just greater than zero speed. In other words, with motors 106 and generator 104 having substantially matched impedances within the system, the magnitude of the voltage and current needed by the motors 106 to initiate and maintain synchronous acceleration during ramped acceleration of the generator are within the operating capacity of generator 104. In addition, the generator 104 may include sufficient capacity to produce excess (e.g., 125%-150%) of the voltage and/or torque producing current required by motors 106 for predetermined periods (e.g., 5 seconds) without detrimental effect. Substantially zero speed of the shaft 110 refers to the lowest speed in which the generator 104 can source sufficient terminal voltage and current to supply the very small static friction torque, negligible load torque, and torque to accelerate the moment of inertia of the motors 106 to the speed of the generator 104 during the ramped acceleration. For example, the generator may be commencing ramped acceleration and still be at substantially zero speed such that the generator rotates about ¼ of an electrical revolution before the motors are imitated to begin synchronously rotating with the generator. By controlling the speed of shaft 110 and the energizing voltage (voltage output signal) provided to exciter 103, controller 112 may be able to control establishing and maintaining the magnetic coupling of motors 106 and loads 108 without additional power electronics, pony motors, and induction rotor devices. The magnetic coupling may be controlled so that when prime mover 102 and generator 104 start (e.g., as shaft 110 first begins to rotate and starts to increase from a zero speed to an operational speed over a period of time ranging from seconds to minutes) and the load torques associated with motors 106 and loads 108, which are of negligible magnitude at low speeds, correspondingly increase, the magnetic coupling, once established, can be correspondingly stiffened to avoid loss of synchronous acceleration of the generator and the motors during ramped acceleration. Controller 112 may control system 100 based on the following theory of operations.

For controller 112 to induce a terminal voltage ($V_{GEN}$) of generator 104 (e.g., a voltage sufficient to provide enough torque producing current to initiate rotation of motor 106 and loads 108), during system start-up and at low rotational rotor speeds (w) of generator 104, controller 112 may energize the field coil of the stator of exciter 103 to induce a voltage with a significantly high magnitude at the frequency of rotation to provide sufficient starting current. That is, the voltage used to energize the field coil of the stator of exciter 103 may have a combination of magnitude and frequency that causes the magnetic flux produced by the stator of exciter 103 to couple across the exciter air-gap between the stator and rotor, so as to produce an excitation signal, such as a field current $I_{FIELD}$ from the rotor of exciter 103, that is sufficient to establish and maintain magnetic coupling between the rotor of the generator 104 and the rotors of all of the synchronous motors 106, without exceeding the voltage and/or current rating of the exciter stator insulation. Establishment of the magnetic coupling occurs by initiating rotation of the rotors of the respective motors 106, and the magnetic coupling is maintained by avoiding excessive torque angle deflection between the rotors of the motors 106 and the rotor of the generator 104. Thus, the excitation signal, such as field current $I_{FIELD}$, is capable of producing sufficient generator phase voltage and torque producing current at whatever speed the generator 104 is rotating.

For example, consider Table 1, which shows example variations in field current $I_{FIELD}$ and terminal voltage $V_{GEN}$ that produce sufficient torque producing current at different rotor speeds (w) within the acceleration profile of the generator to establish and maintain the magnetic coupling using the magnitude of the exciter voltage at exciter 103. Note: The values shown in Table 1 are examples only for the purposes of illustration; actual values vary depending on system parameters and load requirements.

TABLE 1

| Exciter Voltage (V) | Exciter Frequency (Hz) | Field Current - $I_{FIELD}$ (A) | Rotor Speed - ω (RPM) | Terminal Voltage - $V_{GEN}$ @ Rotor speed (V) |
|---|---|---|---|---|
| 6 V | 0 | ~0 | 1 | ~0 |
| 260 V | 200 | 13 | 1 | ~0.19 |
| 200 V | 200 | 10 | 1000 | 145.5 |
| 6 V | 0 | 10 | 1000 | 145.5 |
| 200 V | 200 | 10 | 3300 (rated) | 480 |
| 2 V | 0 | 3.3 | 10000 | 480 |

According to Table 1, with an exciter voltage of 6V, 0 Hz (AC waveform), when a rotor speed (ω) of generator 104 is substantially zero (or low), the field current $I_{FIELD}$ out of exciter 103 may be negligible or zero, which may not be sufficient to produce anything above a negligible terminal voltage $V_{GEN}$ at generator 104, and therefore will not be of sufficient magnitude to produce enough torque producing current to drive motors 106. On the other hand, at an exciter voltage of 260V, 200 Hz, when the rotor speed (ω) of generator 104 is substantially zero (or low), the field current $I_{FIELD}$ out of exciter 103 may be 13 A and may be sufficient to produce a terminal voltage $V_{GEN}$ of generator 104 that is approximately 0.19V, which may produce sufficient magnitude of torque producing current to magnetically couple and initiate rotation of motors 106.

As the rotor speed (ω) increases, the required magnitude of the exciter voltage becomes less and less, to produce a sufficient field current $I_{FIELD}$ out of exciter 103 that is sufficient to produce a terminal voltage $V_{GEN}$ of generator 104 and corresponding torque producing current to magnetically couple and drive motors 106. For example, at an exciter voltage of only 200V, 200 Hz, when the rotor speed (ω) of generator 104 is approximately ⅓ the operational speed of 3300 RPM (e.g., 1000 RPM), the field current $I_{FIELD}$ out of exciter 103 of 10A may be sufficient to produce a terminal voltage $V_{GEN}$ of generator 104 that is approximately 145.5V, which may be of sufficient magnitude to magnetically couple and drive motors 106.

Table 1 also shows that when the rotor speed (ω) of generator 104 is relatively high (e.g., at 1000 RPM or some other operational speed), an exciter voltage of only 6V, 0 Hz (DC waveform) may produce a field current $I_{FIELD}$ out of exciter 103 of 10A which may be sufficient to produce a terminal voltage $V_{GEN}$ of generator 104 that is approximately 145.5V. In other words, Table 1 shows that, when the exciter voltage of exciter 103 is increased to a relatively high frequency (e.g. 200 Hz), by increasing the magnitude of the exciter voltage to sufficiently high levels (e.g., 200V), exciter 103 may produce a field current $I_{FIELD}$ that is sufficiently high (e.g., 10A), even near substantially zero or low speed (ω), to produce a terminal voltage $V_{GEN}$ that is sufficient for driving motors 106 to begin and maintain rotation. As the rotor speed (ω) of the generator 104 increases beyond a threshold speed (e.g., ⅓ operational or ⅓ max speed), the magnitude of the exciter voltage can be reduced and still cause exciter 103 to produce a sufficiently high field current $I_{FIELD}$ to maintain the magnetic coupling and drive the motors 106. When the rotor speed (ω) reaches a predetermined rotational speed, such as an operational speed or a maximum speed, the AC component of the exciter voltage can be removed entirely and the exciter voltage can be a nominal DC voltage (e.g., 6V, 0 Hz). See FIG. 5 for a graphical view of an example of the relationship between exciter voltage and rotor speed (ω).

The above theory of operations may enable controller 112 to re-configure exciter 103 from operating as an "inside out" field wound motor, to operating as a transformer, such as an air gap transformer. In other words, when the magnetic coupling between the generator 104 and motors 106 is established and maintained as the shaft 110 is increasing from substantially zero speed up to its operational speed, controller 112 may provide an exciter voltage to exciter 103 that is of sufficiently "high magnitude and frequency" for inducing the terminal voltage $V_{GEN}$ at bus 114 that is needed to initiate and maintain rotation of motors 106 and load 108 synchronous with the accelerating rotational speed of the generator 104.

In operation, referring to FIG. 4, controller 112 may initiate a ramped increase in rotational speed of the shaft 110 that mechanically couples the prime mover 102, such as a jet engine, of the system 100 to the synchronous AC generator 104 of the system (400). The ramped increase in rotational speed may be from a zero speed condition of the AC generator 104. For example, during a period of time that is associated with the start-up of prime mover 102, controller 112 may provide a signal and/or command to prime mover 102 that causes shaft 110 to begin a ramped acceleration, such as an acceleration profile, from a zero speed condition to an operational speed. At the onset of an establishing phase, or start-up phase of the ramped acceleration (e.g., lasting anywhere from between zero and five seconds), the rotors of exciter 103 and generator 104 begin spinning congruently with shaft 110. (402) During the ramped acceleration, controller 112 may receive sensor information indicative of an angular position of the rotor of the synchronous generator 104 in relation to the angular position of the rotors of the synchronous motors 106, as prime mover 102 mechanically spins or rotates shaft 110 (404). For example, controller 112 may infer the relation of the angular positions based on voltage and/or current measurements taken within the system 100 (such as from AC generator 104), power angle measurements (such as from bus 214), or any other sensed parameters indicative of the relation of the angular positions of the generator 104 and motors 106.

While the speed of shaft 110 is at substantially zero, or at any time during the establishing phase while shaft 110 is in ramped acceleration, controller 112 may induce excitation in system 100. (406) The resulting field current $I_{FIELD}$ causes motors 106 and loads 108 to "spin-up" or be induced (energized) to begin rotating synchronously with AC generator 104 by establishing a magnetic coupling between the rotor of the generator 104 and the rotors of all of the motors 106 during the establishing phase. (408) Controller 112 may determine a level of a field current $I_{FIELD}$ needed to excite the AC generator 104 in order to establish a magnetic coupling between the AC generator 104 and the electrical motors 106 that are electrically coupled to the AC generator and are configured to drive one or more mechanical loads 108. For example, controller 112 may utilize a function or a look-up table of values to determine the level of field current $I_{FIELD}$ needed by AC generator 104 to produce a terminal voltage $V_{GEN}$ at bus 114 that is of sufficient magnitude and frequency to supply starting current to establish the magnetic coupling and begin turning motors 106 and loads 108 as shaft 103 accelerates during the establishing phase. In some examples, controller 112 may input the speed into a function or look-up table and determine, based on the function or look-up table, that the level of the field current $I_{FIELD}$ is at a maximum level of current when the speed of the shaft is at substantially zero speed.

After the magnetic coupling is established, the ramped acceleration enters a maintaining phase in which the controller 112 controls the field current $I_{FIELD}$ to maintain the magnetic coupling so the generator 104 drives the motors 106 to accelerate at the same speed as the generator toward the rated speed of the system (410) During the maintaining phase, the controller 112 may adjust the field current $I_{FIELD}$ based on the angular deflection of the angular position of the generator 104 with respect to the angular positions of the motors 106 (412). In an example system, as the speed increases, the stiffness of the magnetic coupling increases, and the level of the field current $I_{FIELD}$ may be correspondingly reduced. Accordingly, at the conclusion of the ramped acceleration, the level of the field current may be at a minimum level when the speed of the shaft is at an a operational speed (e.g., 3300 RPM or some other speed needed to drive AC generator 104 to produce the rated $V_{GEN}$ at bus 114). Upon reaching rated operational speed, the ramped synchronous acceleration of the generator and the motors concludes, and the controller 112 may control the exciter to output the field current $I_{FIELD}$ to maintain the voltage on the bus 114 (414).

In example operation, establishing and the maintaining the magnetic coupling may involve the controller 112 determining the speed of the shaft 110, a power angle of the AC generator 104 and changes, over time, in the speed of the shaft 110 and the power angle of the AC generator 104 with respect to a power angle of the loads 106. In this case, controller 112 may determine the level of the field current $I_{FIELD}$ needed to excite the AC generator sufficiently to establish and maintain the magnetic coupling between the AC generator and all of the motors that are electrically coupled to the AC generator and configured to drive one or more mechanical loads based on the speed of the shaft 110, the power factor of the AC generator, and changes, over time, in the speed of the shaft 110 and the power factor of the AC generator. Thus, in some examples, the function, look-up table, and/or algorithm that controller 112 may use to determine the field current $I_{FIELD}$ needed for a particular load condition may be determined by other than the angular deflection of the rotor positions. Controller 112 may input at least one of the rotational speed, the power factor, or changes in the speed and/or the power factor, into a function and/or look-up table and determine, based on an output from the function and/or look-up table, the level of the field current $I_{FIELD}$ to maintain, increase or decrease the stiffness of the magnetic coupling.

The excitation system 105 may adjust the excitation signal, such as the field current $I_{FIELD}$, to maintain the power factor of the AC generator in a predetermined range, such as greater than −0.9, less than +0.9, or otherwise near 1.0, as the power factor fluctuates in the predetermined range. As the speed of the shaft 110 changes and the power factor changes, controller 112 may update its determination at any given time regarding the level of field current $I_{FIELD}$ needed to excite the AC generator 104 and maintain the synchronous AC generator 104 magnetically coupled with all of the synchronous electric motors 106 that are electrically coupled to the AC generator 104 and configured to drive one or more mechanical loads 108. In other words, the function and/or look-up table used by controller 112 may factor in changes in speed, motor load, and/or power factor to cause controller 112 to adjust the field current $I_{FIELD}$ accordingly.

Controller 112 may control the exciter 103 of the system 100 to cause the exciter 103 to output the level of the field current $I_{FIELD}$ to excite the AC generator 104 and establish and maintain the magnetic coupling between the synchronous AC generator 104 and the synchronous electrical motors (420) during ramped acceleration. For example, controller 112 may establish magnetic coupling of the AC generator 104 and the motors 106 by increasing the level of the field current $I_{FIELD}$ above a rated level to induce rotation of the motors 106 when the generator first begins to rotate. After the magnetic coupling has been established, the controller 112 may vary the output from exciter 103 during ramped synchronous acceleration of the generator 104 and the motors 106 to maintain, increase or decrease and angular deflection between the generator rotor angle and the motor rotor angles. Alternatively, during start-up of system 100, the field current $I_{FIELD}$ may be varied to adjust the stiffness of the magnetic coupling in response to controller 112 determining that the speed of the shaft 110, the power factor of the AC generator 104, and/or changes, over time, in the speed of the shaft 110 and the power factor of the AC generator 104 warrant such variation in the field current $I_{FIELD}$.

Controller 112 may control the field current $I_{FIELD}$ using a voltage output signal or command to control the exciter voltage. Although referred to herein as a "voltage output signal," control of exciter 103 by the controller 112 to output the field current $I_{FIELD}$ may be a command, a variable excitation voltage output by the controller 112, or a control signal provided directly to the exciter 103 to create the exciter voltage, or to a power supply or other device that may directly or indirectly create the exciter voltage to induce the exciter 103 to output the field current $I_{FIELD}$. The voltage output signal may cause application of an exciter voltage to the exciter 103 that has a sufficient magnitude or frequency to induce (when the shaft 110 is at substantially zero speed) a field current $I_{FIELD}$, and therefore a terminal voltage $V_{GEN}$, at the AC generator. The terminal voltage $V_{GEN}$ may cause sufficient torque producing current at the synchronous electric motors 106, during ramped acceleration of the generator 104, to initiate synchronous rotation with the generator 104 to drive the one or more mechanical loads 108. For instance, in some examples, the terminal voltage $V_{GEN}$ is a minimum voltage needed by motors 106 to accelerate loads 108 from substantially zero speed. By utilizing the principles of Table 1, controller 112 may apply a relatively high level of exciter voltage at a relatively high frequency, to the armature of exciter 103 such that a field current $I_{FIELD}$ is induced out of exciter 103, even if shaft 110 is not spinning or spinning slowly. As the speed of shaft 110 accelerates along an acceleration profile to operational speed, controller 112 may reduce the magnitude of the exciter voltage back down to predetermined operating levels associated with the operational speed(s).

In some examples, controller 112 may apply the exciter voltage directly (e.g., via an internal voltage source) using the voltage output signal. In other examples, exciter 103 may include a variable voltage source and controller 112 may control the variable voltage source of exciter 103 to output the exciter voltage based on the voltage output signal to produce a sufficiently high voltage or frequency at the field coil of exciter 103 to induce a terminal voltage $V_{GEN}$ at AC generator 104 that causes motors 106 to drive loads 108.

In some examples, controller 112 may continue to monitor the speed of shaft 110, the power factor of AC generator 104, the magnitude of the terminal voltage $V_{GEN}$, the level of field current $I_{FIELD}$ out of exciter 103, and the rotational speed or acceleration of loads 108 and dynamically adjust the amount of excitation that controller 112 applies to exciter 103 accordingly. For example, controller 112 may dynamically adjust the exciter voltage to exciter 103 by decreasing a magnitude of the exciter voltage in response to determining an increase in the rotational speed of the shaft 110 or an increase in a speed of the one or more mechanical loads. For example, controller 112 may dynamically decrease the magnitude of the exciter voltage proportionally to the level of increase in the speed of the shaft 110, or an increase in the speed of the one or more mechanical loads. In other words, at speeds where the DC excitation becomes effective, as the speed of shaft 110 increases or as the speed of the one or more mechanical loads 108 increases, controller 112 may decrease the level of exciter voltage or in some examples, may transition to modulated low voltage DC excitation, since the increasing speed of shaft 110 or the increasing speed of the one or more loads 108 may lead to an increase in the level of field current $I_{FIELD}$ out of exciter 103, and thereby lead to an increase or maintaining of the level of the terminal voltage at bus 114.

In some examples, as also described elsewhere, controller 112 may monitor the power factor of AC generator 104 and dynamically adjust the field current by adjusting the magnitude or frequency of the exciter voltage so as to substantially maintain unity power factor. As used herein, substantially maintaining unity power factor refers to maintaining the power factor within a predetermined range of unity such as +/−0.1, such that the power factor ranges from 0.90 lagging to 1.10 leading. For example, controller 112 may dynamically vary the exciter voltage magnitude and frequency to increase the field current $I_{FIELD}$ to move the power factor to the lagging region (e.g., in response to determining the power factor is greater than one or "leading"). Conversely, controller 112 may dynamically vary the exciter voltage magnitude and frequency to decrease the field current $I_{FIELD}$ to move the power factor to the leading region (e.g., in response to determining the power factor is less than one or "lagging").

In some examples, controller 112 may apply the exciter voltage to the exciter, so as to induce a field current $I_{FIELD}$ and terminal voltage, at low speeds by setting the magnitude of the exciter voltage to a maximum voltage when the speed of the shaft is at a substantially zero speed and setting the magnitude of the exciter voltage to a minimum voltage when the speed of the shaft is at an operational speed. In other words, controller 112 may utilize the principles of Table 1 and as described above to use a relatively high magnitude and frequency exciter voltage when the speed of shaft 110 is low (e.g., less than operational speed) and use a lower magnitude and frequency exciter voltage when the speed of shaft 110 is high (e.g., at operational speed).

By energizing exciter 103 with a particular high level and high frequency voltage in this way, controller 112 may control the field current $I_{FIELD}$ output from exciter 103 even at low rotational speeds. Controller 112 may control exciter 103 using a speed independent exciter armature or exciter voltage, and therefore, dynamically control the field current $I_{FIELD}$ providing the magnetic flux of the rotor of generator 104 so as to permit a significant terminal voltage $V_{GEN}$, even at very low shaft speeds. The significant terminal voltage $V_{GEN}$ may induce current flow in the attached load motors 106 and thus torque, thereby accelerating load motors 106 to match the electrical speed of generator 104.

As the components of system 100 spin-up to a predetermined operational speed, the exciter field energizing voltage may increase in frequency, decrease in AC magnitude, and an additional DC component may increase. Near operational speed, the AC component of the exciter field voltage may be eliminated and controller 112 may use techniques, such as power factor control, to control the DC component to ensure continued synchronization of load motors 106 under varied load conditions.

Figure 5:
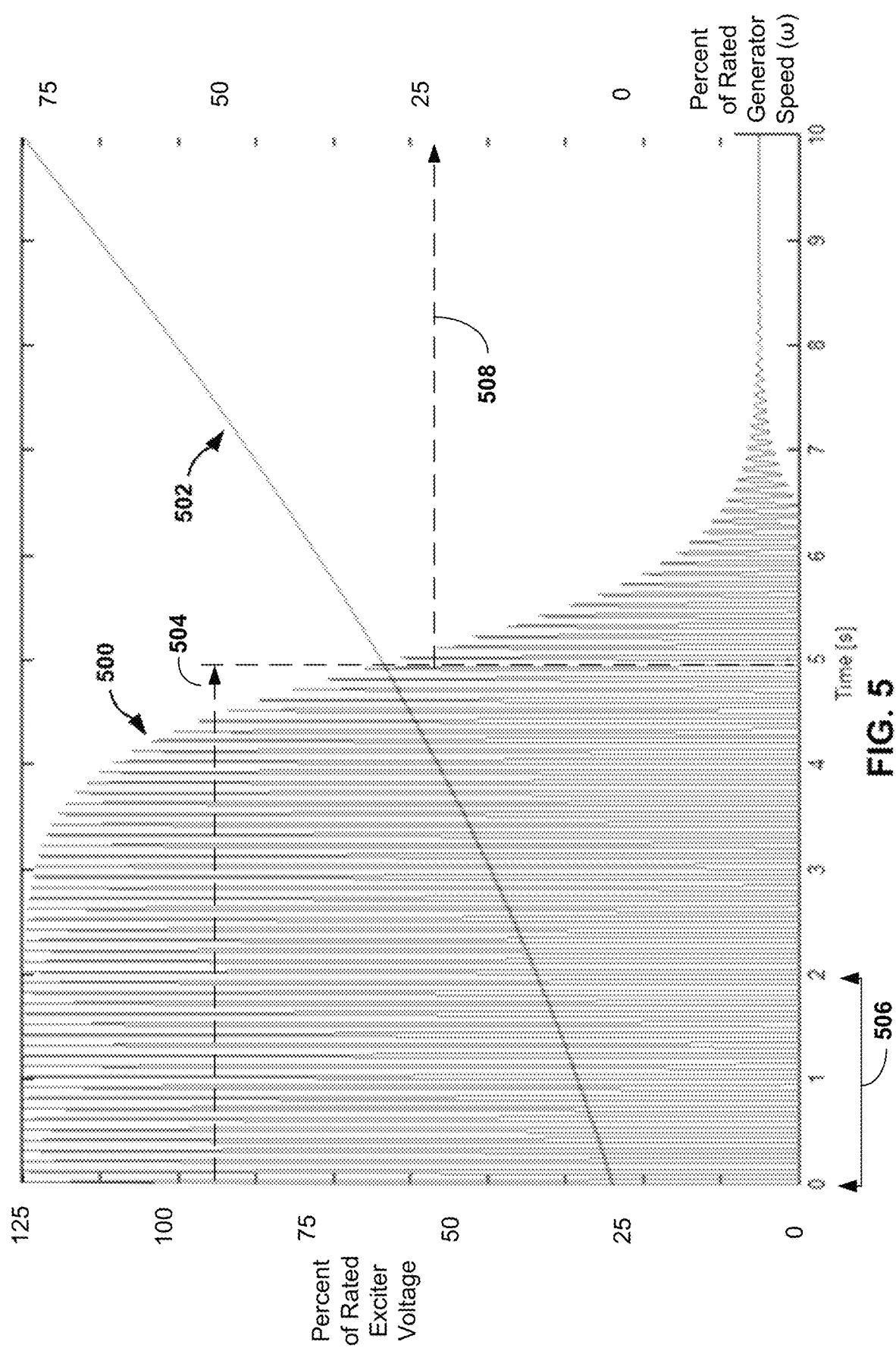
FIG. 5 is a diagram illustrating a variable exciter voltage as compared to rotor speed of an example synchronous power system for providing electrical power from a synchronous alternating current generator to synchronous motors, in accordance with one or more aspects of the present disclosure.

FIG. 5 is a diagram illustrating a variable exciter voltage 500 as compared to rotor speed (ω) 502 during ramped acceleration of an example synchronous power system, such as a system for providing polyphase electrical power from a synchronous alternating current generator to synchronous motors, in accordance with one or more aspects of the present disclosure. The variable exciter voltage 500 is delivered to the exciter as an AC signal during an establishing phase 504 of the ramped acceleration, which, in this example, is about 5 seconds. In other examples, the establishing phase may be longer or shorter. During the establishing phase 504, the magnetic coupling between the generator and the motors may be established. In the example of FIG. 5, the magnetic coupling is illustrated as being established in a magnetic coupling establishment range 506 of about 1-2 seconds after start of rotation of the generator from a stopped condition, and generate the exciter voltage 500 at 125% of rated so as to create a field current $I_{FIELD}$, such as at 125% of rated output.

For example, with reference to Table 1, the variable exciter voltage 500 may be at 260V, the field current may be at 13 Amp, and the generator rotor speed may be substantially zero, such as 1 RPM. In other examples, the magnetic coupling establishment range 506, the level of exciter voltage 500, and the level of field current may be different. In FIG. 5, once the magnetic coupling is established, the exciter voltage 500 is adjusted by the controller to be less than 100% before the end of the establishment phase 504 while still maintaining the magnetic coupling due to the accelerating speed of both the generator and the motors.

During a maintaining phase 508, after the magnetic coupling has been established, the variable exciter voltage 500 transitions from delivery as an AC signal to delivery as a DC signal. As the rotor speed (ω) 502 of generator increases during the maintaining phase, a controller, such as controller 112, may decrease the magnitude of the exciter voltage. For instance, with reference to Table 1, when the rotor speed (ω) 502 of generator reaches approximately 1000 RPM or ⅓ its operational speed, controller 112 may apply a 200V, 200 Hz exciter voltage to the exciter to generate a field current of 10 A. And eventually, once the rotor speed (ω) 502 of generator reaches approximately 3300 RPM and higher, up to is maximum operational speed, the controller may decrease the magnitude of exciter voltage further, eventually only applying only a minimal 5V, 0 Hz exciter voltage to the exciter. The example of FIG. 5 only shows a portion of the maintaining phase 508. In other examples, other durations of the maintaining phase are possible.

In examples where the generator includes a relatively high impedance when compared to a relatively low impedance of motors, such as motors 106, the voltage at the output of the generator may be largely dictated by the motors. For example, the impedance of the generator may be three or four per unit (p.u.) and the impedance of the motors, as viewed from the generator may be one or two p.u. In such examples, changes in the exciter voltage supplied to the generator may result in changes in a magnitude of the torque producing current output of the generator with relatively little change in voltage output of the generator due to the flux linkage between the synchronized rotating motors and rotating generator.

During a startup condition, such as when the speed of the generator is substantially zero and first begins to rotate, or at rotational speeds of less than full speed, such as less than 50% of rated speed of the generator, the motors and the generator may be magnetically coupled and synchronously rotating at the same rotational speed. Under these conditions, the synchronous coupling, or magnetic coupling, between the generator and the motors may be a relatively "loose" coupling or a relatively low "stiffness" in the magnetic coupling of the generator rotor and the motor rotors due to the low rotational speed conditions. (e.g. low change in electrical torque transfer with electrical angle of displacement of motor(s) with respect to generator) For example, a relatively high per unit generator with a relatively low per unit load motors and fixed exciter current may have a significantly reduced increase in power with motor electrical displacement angle.

As described herein, a "loose coupling" or "stiffness" refers to the capability of the rotors of the motors and the generator to maintain electrical phase synchronization and magnetic coupling during changing operating conditions, such as perturbations within the system 100. Such perturbations or disturbances may be, for example, a result of changes in the load, such as load 108, on one or more motors, changes in rotational speed of the generator, and/or changes in the field current supplied to the generator. Examples of other changing operating conditions may include changes in the rotational speed of both the generator 104 and corresponding synchronized motors 106. The robustness of the magnetic coupling of the generator rotor and the motor rotors may be affected by system operating conditions such as the rotational speed, the magnitude of current flow to the motors, and the power factor angle. As the rotational speed of the generator 104 increases, and/or the current flow to the motors 106 increases, the magnetic coupling between the generator 104 and the motors 106 may increase in stiffness making a loss of synchronism between the generator 104 and the motor 106 less likely to occur. In addition, a power factor angle between the voltage and current that is lagging may result in a stiffer coupling when compared to, for example, a unity power factor.

At the time the generator first begins to rotate, via mechanical rotational force, such as provided by a prime mover, the motors may be magnetically coupled with the generator. Since the motors are not rotating at this time, magnetic coupling between the generator rotor and the motor rotors has not yet been established. Establishment of such magnetic coupling will result in the motors beginning to rotate synchronously with the accelerating speed of the generator.

At substantially zero, or very low rotational speed of the generator, the generator may be excited by the exciter to generate electric power, which is supplied to the motors. Based on the excitation, the generated electric power may be supplied at sufficient voltage and torque producing current to overcome any anti-rotational forces, such as static friction present at the motors. The static friction of the motors 106, or stiction, may include mechanical friction, however counter torque, or back EMF is not yet present in the motors, since the motor are not yet rotating synchronously with the generator. Due to the absence of rotation (or low frequency rotation of the generator—such as less than one or two Hz) the magnetic coupling of the rotor of the generator and the rotor of the motors may be initiated or enhanced based on control of the field current by the controller to supply starting current to the motors.

As the field current is introduced, the magnetic coupling between the generator rotor and the motor rotors can be correspondingly established such that the motors are induced to begin rotating in electrical synchronism with the generator. In addition, in response to the magnetic coupling of the generator and the motors, a bus voltage may be established and maintained while the magnetic coupling is maintained. The magnetic coupling between generator and motors is maintained by the controller selectively varying the field current as the rotational speed is ramped from substantially zero to rated speed.

Commencing rotation of the generator 104 may be initiated with a prime mover driving a shaft that is coupled with the generator 104. In example systems where it may not be desirable to operate the prime mover at a relatively slow rotational speed, an auxiliary rotational source may be temporarily coupled with the generator 104 to commence ramped acceleration during the establishing phase. Examples of systems without relatively slow rotational speed of the prime mover may include systems where the prime mover operates with a fixed ramped acceleration profile once started, or where there is a lack of granularity of speed adjustment of a prime mover at such low speeds. In such systems, the prime mover may remain off, or not driving the generator 604, until such time as the first stage, or establishing stage is completed (magnetic coupling completed), and ramped uniform acceleration during the second stage (the maintaining stage), is desired to accelerate the generator and motors up to full rated speed. The auxiliary rotational source may be an electric motor or other source of mechanical rotational force that may be controlled to achieve a relatively slow rotational speed upon demand during the establishing phase. In such a system, the controller 612 may control the activation and speed of the auxiliary rotational source, as well as transition from the auxiliary rotational source to the prime mover when exiting the establishing phase and entering the maintaining phase of ramped acceleration to full rated speed.

In an example system, an auxiliary rotational device, such as an electric machine, is available on the same shaft/drivetrain, such as a 'hotel' generator. In this example system, the auxiliary rotational device is capable of operating as a motor or as a generator. Thus, the auxiliary rotational device may be used as a motor to provide a controlled slow start of the generator, such as via generator shaft, before the prime mover is introduced. For example, where the prime mover is a jet engine, the auxiliary rotational device may rotate the generator at relatively low rotational speed as controlled by the controller prior to any actual engine combustion within the jet engine being introduced. This would allow the system to come up to a very low speed magnetically coupled condition before introducing fuel. This example system may allow operation during starting, where a relatively low speed (such as about 10 rpm) may be the ramped acceleration target while magnetic coupling of the generator and the motors occurs. Once the motors are magnetically coupled with the generator, starting of the prime mover, such as jet engine starting, may be commenced. Thus, in this example, the generator may be magnetically coupled with the motors before the prime mover is started.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The subject-matter of the disclosure relates, among others, to the following aspects:

1. A system comprising:
   a prime mover configured to provide mechanical energy to the system by spinning a shaft;
   a synchronous AC generator comprising a rotor mechanically coupled to the shaft;

an exciter mechanically coupled to the shaft and configured to output a variable field current to excite the synchronous AC generator;

a plurality of synchronous electric motors electrically direct coupled to the synchronous AC generator and each comprising a rotor rotatable operable to drive one or more mechanical loads; and a controller configured to establish and maintain a magnetic coupling between the rotor of the synchronous AC generator and all of the rotors of the synchronous electric motors by controlling a level of the field current during a ramped increase in rotation of the rotor of the synchronous AC generator from zero rotational speed.

2. The system of claim 1, wherein the controller is further configured to control the level of the field current based on a difference in an angle of deflection between a position of the rotor of the synchronous AC generator and a position of the rotors of the synchronous electric motors.

3. The system as in either claim 1 or 2, wherein the controller is further configured to control the level of the field current by application of an excitation voltage to the exciter with a magnitude and/or frequency to induce a terminal voltage at the synchronous AC generator that causes supply of torque producing current to the synchronous electric motors to commence rotation of the synchronous electric motors by establishment of the magnetic coupling during the ramped increase in rotation of the rotor of the synchronous AC generator from zero rotational speed.

4. The system of claim 3, wherein the terminal voltage is a minimum voltage needed to generate enough torque producing current to accelerate the one or more mechanical loads from a zero speed during the ramped increase in rotation of the rotor of the synchronous AC generator from zero rotational speed.

5. The system as in either of claim 3 or 4, wherein the controller is further configured to decrease the magnitude of the excitation voltage in response to an increase in a speed of the shaft or an increase in a speed of the one or more mechanical loads to maintain the magnetic coupling during the ramped increase in rotation of the rotor of the synchronous AC generator toward rated rotational speed.

6. The system as in any of claims 1-5, wherein: the controller is further configured to control the level of the field current by application of an excitation voltage to the exciter a magnitude of the excitation voltage controlled by the controller to accelerate the synchronous electric motors at a same rate that the prime mover accelerates the synchronous AC generator.

7. The system of claim 6, wherein: the controller is further configured to:

set the magnitude of the excitation voltage to a predetermined voltage when the speed of the shaft is at a zero speed; and set the magnitude of the excitation voltage at less than the predetermined voltage as the prime mover accelerates the speed of the shaft towards rated operational speed of the synchronous AC generator.

8. The system as in any of claims 1-7, wherein the controller is configured to maintain synchronization of the synchronous electric motors to the synchronous AC generator by adjustment of the level of the field current based on an acceleration profile of the rotor of the synchronous AC generator between zero rotational speed and a rated operational speed of the synchronous AC generator.

9. The system as in any of claims 1-8, wherein the controller is configured to maintain synchronization of the synchronous electric motors to the synchronous AC generator during the ramped increase in rotation of the rotor of the synchronous AC generator from zero rotational speed by controlling the level of the field current during a start-up period of the prime mover.

10. A method comprising:

initiating rotation of a prime mover to commence a ramped increase in rotational speed of a synchronous AC generator from a zero speed condition;

establishing, by a controller, a level of a field current to excite the synchronous AC generator to form a magnetic coupling between the synchronous AC generator and a plurality of synchronous electric motors that are electrically coupled to the synchronous AC generator and configured to drive respective mechanical loads; and controlling, by the controller, the level of field current to maintain the magnetic coupling during the ramped increase in rotational speed of the synchronous AC generator to a full rated speed condition so that the plurality of synchronous electric motors remain synchronized with the synchronous AC generator.

11. The method of claim 10, further comprising:

determining, by the controller, a rotor angle of the synchronous AC generator in relation to an average rotor angle of the plurality of synchronous electric motors; and adjusting the field current, by the controller, according to the determined relation during the ramped increase in rotational speed of the synchronous AC generator to the full rated speed condition.

12. The method as in either of claim 10 or 11, wherein establishing, by the controller, the level of a field current to excite the synchronous AC generator to form the magnetic coupling between the synchronous AC generator and the plurality of synchronous electric motors comprises applying, by the controller, a magnitude of excitation voltage to an exciter to induce a terminal voltage at the synchronous AC generator that causes torque producing current at the plurality of synchronous electric motors to induce synchronous rotation of all the plurality of synchronous electric motors and the respective mechanical loads from zero speed.

13. The method of claim 12, wherein all the plurality of synchronous electric motors and the respective mechanical loads are in a no-load condition at zero speed, and the magnitude of excitation voltage applied to the exciter to induce the terminal voltage at the synchronous AC generator causes only enough torque producing current at the plurality of synchronous electric motors to induce synchronous rotation under the no-load condition.

14. The method as in any of claims 10-13, wherein controlling the level of the field current to maintain the magnetic coupling during the ramped increase in rotational speed of the synchronous AC generator to the full rated speed condition comprises variably applying, by the controller, an excitation voltage to an exciter at a magnitude and/or frequency to induce a terminal voltage at the synchronous AC generator that causes enough torque producing current at the plurality of synchronous electric motors to drive the respective mechanical loads during the ramped increase.

15. The method of claim 14, wherein variably applying the excitation voltage to the exciter comprises decreasing, by the controller, a magnitude of the excitation voltage in response to stiffening of the magnetic coupling between the synchronous AC generator and the plurality of synchronous electric motors during the ramped increase in rotational speed of the synchronous AC generator to the full rated speed condition.

16. The method as in any of claims 10-15, wherein establishing, by the controller, the level of a field current to excite the synchronous AC generator to form the magnetic coupling between the synchronous AC generator and the plurality of synchronous electric motors comprises:

setting, by the controller, the level of field current to a maximum to induce synchronous rotation of all the plurality of synchronous electric motors and the respective mechanical loads from zero speed; and wherein controlling the level of the field current to maintain the magnetic coupling during the ramped increase in rotational speed of the synchronous AC generator to the full rated speed condition comprises reducing, by the controller, the level of field current toward a minimum during the ramped increase in rotational speed of the synchronous AC generator to the full rated speed condition.

17. The method as in any of claims 10-16, wherein controlling, by the controller, the level of field current to maintain the magnetic coupling during the ramped increase in rotational speed of the synchronous AC generator to the full rated speed condition comprises accelerating the synchronous electric motors synchronously with acceleration of the synchronous AC generator during the ramped increase in rotational speed of the synchronous AC generator to the full rated speed condition.

18. The method of claim 17, wherein controlling, by the controller, the level of field current to maintain the magnetic coupling during the ramped increase in rotational speed of the synchronous AC generator to the full rated speed condition comprises inferring, by the controller, a torque deflection angle representative of a difference in a rotor position of the synchronous AC generator and an average rotor position of the plurality of synchronous electric motors.

19. A system comprising:

a synchronous AC generator rotated by a prime mover to generator electric power;

an exciter rotated by the prime mover to generate a field current to excite the synchronous AC generator; and a controller configured to control a level of excitation of the exciter to form a magnetic coupling between the synchronous AC generator and a plurality of synchronous electric motors electrically coupled with the synchronous AC generator, the field current generated and the magnetic coupling formed as the synchronous AC generator and the exciter are accelerated from a zero speed condition by the prime mover; and the controller further configured to control the level of excitation of the exciter to maintain the magnetic coupling and synchronously accelerate the plurality of synchronous electric motors with the synchronous AC generator toward a rated speed of the synchronous AC generator.

20. The system of claim 19, wherein the controller is configured to control a level of excitation of the exciter in a range between 100% and 150% of a rated level of excitation of the exciter to induce rotation of the plurality of synchronous electric motors so that the magnetic coupling is formed between the synchronous AC generator and the plurality of synchronous electric motors.

Various examples have been described. These and other examples are within the scope of the following claims.

We claim:

1. A system comprising:
a synchronous AC generator configured with output terminals to output electric power to a plurality of synchronous motors electrically coupled thereto; and
a controller configured to control the synchronous AC generator to control a magnitude of torque producing current and a magnitude of terminal voltage at the output terminals;
the controller configured to control initiation of rotation and ramped acceleration of a rotational speed of the synchronous AC generator from a zero speed condition;
the controller further configured to initiate acceleration of the synchronous AC generator from the zero speed condition and increase the magnitude of the torque producing current and control the magnitude of the terminal voltage to magnetically couple the synchronous motors and the synchronous AC generator by increase of an exciter voltage of an exciter of the synchronous AC generator, at a time acceleration from the zero speed condition is initiated, above a 100% rated exciter voltage output of the exciter to initially energize the synchronous motors, the 100% rated exciter voltage being a value of the exciter voltage at rated speed operation of the synchronous AC generator, wherein the controller is configured to maintain the exciter voltage increased above the 100% rated exciter voltage output of the exciter for a predetermined time during the time acceleration from the zero speed condition is initiated to magnetically couple the synchronous motors and the synchronous AC generator.

2. The system of claim 1, wherein the controller is configured to control the magnitude of the torque producing current and control the magnitude of the terminal voltage in accordance with an angular difference between a rotor of the synchronous AC generator and at least one rotor of the synchronous motors after magnetic coupling is established and acceleration from the zero speed condition is initiated.

3. The system of claim 1, wherein the controller is configured to control the magnitude of the torque producing current and control the magnitude of the terminal voltage as a function of a rotational speed of the synchronous AC generator as the rotational speed of the synchronous AC generator accelerates away from the zero speed condition.

4. The system of claim 1, wherein the controller is configured to control the magnitude of the torque producing current and control the magnitude of the terminal voltage based on a predetermined table of a plurality of different rotational speeds of the synchronous AC generator as the rotational speed of the synchronous AC generator accelerates away from the zero speed condition.

5. The system of claim 4, wherein the controller is configured to factor in changes in at least one of rotational speed of the synchronous AC generator, loading of the synchronous motors and power factor of the synchronous AC generator to control of the magnitude of the torque producing current and control of the magnitude of the terminal voltage based on the predetermined table.

6. A method comprising;

controlling, with a controller, a magnitude of torque producing current and a magnitude of terminal voltage at output terminals of a synchronous AC generator;

controlling, with the controller, initiation of rotation and ramped acceleration of a rotational speed of the synchronous AC generator from a zero speed condition;

increasing, with the controller, a level of the magnitude of the torque producing current of the synchronous AC generator as part of the initiation of rotation and the ramped acceleration of the rotational speed of the synchronous AC generator from the zero speed condition;

magnetically coupling the synchronous AC generator to a plurality of synchronous motors, the synchronous motors electrically coupled with the output terminals at initiation of rotation of the synchronous AC generator;

increasing an excitation voltage of an exciter of the synchronous AC generator above 100% of a rated exciter output voltage at initiation of rotation of the synchronous AC generator to initially energize and induce rotation of the synchronous motors; and controlling, with the controller, the magnitude of the torque producing current of the synchronous AC generator based on a stiffness of magnetic coupling between the synchronous AC generator and the synchronous motors.

7. The method of claim 6, further comprising impedance matching the synchronous AC generator with a system impedance, the system impedance comprising a parallel impedance of the synchronous motors.

8. The method of claim 6, wherein magnetically coupling the synchronous AC generator to the synchronous motors comprises the synchronous motors establishing torque on a respective output shaft of each of the synchronous motors at initiation of rotation of the synchronous AC generator.

9. The method of claim 6, wherein magnetically coupling the synchronous AC generator to the synchronous motors comprises overcoming a counter-torque of each of the synchronous motors such that all of the synchronous motors commence synchronous rotation with the synchronous AC generator during initiation of rotation of the synchronous AC generator.

10. The method of claim 6, wherein increasing the level of the magnitude of the torque producing current of the synchronous AC generator comprises outputting the magnitude of the terminal voltage at a frequency of 1 or 2 Hz at initiation of rotation of the synchronous AC generator.

11. The method of claim 6, further comprising maintaining the synchronous AC generator magnetically coupled with the synchronous motors by decreasing the magnitude of the torque producing current of the synchronous AC generator as a function of the ramped acceleration in speed away from the zero speed condition.

12. The method of claim 11, further comprising controlling, with the controller, the magnitude of the torque producing current of the synchronous AC generator based on a relational difference in an angle of deflection between a position of a rotor of the synchronous AC generator and a position of at least one rotor of the synchronous motors.

13. A system comprising:
a synchronous AC generator comprising power output terminals electrically coupled with a plurality of synchronous motors;
an exciter configured to excite the synchronous AC generator with an exciter voltage so that the synchronous AC generator outputs torque producing current and voltage on the power output terminals of the synchronous AC generator; and
a controller configured to initiate rotation of the synchronous AC generator and increase a level of the torque producing current of the synchronous AC generator with the exciter voltage to generate a magnitude of torque producing current and voltage on the power output terminals of the synchronous AC generator to initially energize and establish magnetic coupling of the synchronous motors and the synchronous AC generator during initiation of rotation of the synchronous AC generator, the controller further configured to control the magnitude of the torque producing current of the synchronous AC generator based on a stiffness of magnetic coupling between the synchronous AC generator and the synchronous motors.

14. The system of claim 13, wherein the controller is configured to increase the exciter voltage to greater than a 100% rated excitation voltage output of the exciter to establish magnetic coupling, wherein 100% rated excitation voltage output is a magnitude of excitation voltage supplied to the synchronous AC generator by the controller to provide rated output voltage and current on the power output terminals after rotational speed of the synchronous AC generator is ramped to rated speed of the synchronous AC generator.

15. The system of claim 13, wherein the controller is further configured to monitor an angular deflection between a rotor of the synchronous AC generator and rotors of the synchronous motors during ramped synchronous rotational acceleration the synchronous AC generator and the synchronous motors between establishment of magnetic coupling between the synchronous AC generator and the synchronous motors and full rated rotational speed.

* * * * *